(12) United States Patent
Talvensaari et al.

(10) Patent No.: US 9,565,225 B2
(45) Date of Patent: *Feb. 7, 2017

(54) SERVER CONFIGURATION INCLUDING STREAM PREVIEW

(71) Applicant: WOWZA MEDIA SYSTEMS, LLC, Golden, CO (US)

(72) Inventors: Michael Dean Talvensaari, Los Gatos, CA (US); Ian Zenoni, Highlands Ranch, CO (US)

(73) Assignee: WOWZA MEDIA SYSTEMS, LLC, Golden, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/092,511

(22) Filed: Apr. 6, 2016

(65) Prior Publication Data

US 2016/0226938 A1  Aug. 4, 2016

Related U.S. Application Data

(63) Continuation of application No. 14/619,936, filed on Feb. 11, 2015, now Pat. No. 9,338,203.

(Continued)

(51) Int. Cl.
*G06F 13/00* (2006.01)
*G06F 15/00* (2006.01)
(Continued)

(52) U.S. Cl.
CPC ......... *H04L 65/4069* (2013.01); *G11B 27/031* (2013.01); *H04L 65/4084* (2013.01); *H04L 65/604* (2013.01); *H04N 21/00* (2013.01); *H04N 21/2187* (2013.01); *H04N 21/23439* (2013.01); *H04N 21/482* (2013.01); *H04N 21/6125* (2013.01); *H04N 21/6373* (2013.01); *H04N 21/6379* (2013.01); *H04N 21/8166* (2013.01); *H04N 21/8549* (2013.01);
(Continued)

(58) Field of Classification Search
CPC .......................... G06F 17/30056; H04L 65/60
USPC ................ 715/740–741, 763–765, 851–853, 751,715/52, 725
See application file for complete search history.

(56) References Cited

U.S. PATENT DOCUMENTS

2003/0105604 A1   6/2003  Ash et al.
2004/0153561 A1   8/2004  Dalal et al.
(Continued)

OTHER PUBLICATIONS

"Test Player (rtmp and http)"; http://www.ideaweb.it/eng/player.cfm; Obtained Feb. 11, 2015, 1 page.

(Continued)

*Primary Examiner* — Kevin Nguyen
(74) *Attorney, Agent, or Firm* — Toler Law Group, PC (57) ABSTRACT

A method includes receiving first input from a computing device, the first input corresponding to selection of a first media player associated with a first output stream format. In response to the first input, a first stream preview is sent to the computing device in accordance with the first output stream format. The method includes receiving second input from the computing device, where the second input corresponds to selection of a second media player associated with a second output stream format. In response to the second input, a second stream preview is sent to the computing device in accordance with the second output stream format.

20 Claims, 9 Drawing Sheets

Related U.S. Application Data (60) Provisional application No. 61/938,633, filed on Feb. 11, 2014.

(51) Int. Cl.
  *H04L 29/06* (2006.01)
  *H04N 21/00* (2011.01)
  *H04N 21/2187* (2011.01)
  *H04N 21/2343* (2011.01)
  *H04N 21/6373* (2011.01)
  *H04N 21/6379* (2011.01)
  *H04N 21/8549* (2011.01)
  *G11B 27/031* (2006.01)
  *H04N 21/482* (2011.01)
  *H04N 21/61* (2011.01)
  *H04N 21/81* (2011.01)
  *H04N 21/854* (2011.01)
  *H04L 29/08* (2006.01)

(52) U.S. Cl.
  CPC ..... *H04N 21/85406* (2013.01); *H04L 65/608* (2013.01); *H04L 65/80* (2013.01); *H04L 67/02* (2013.01)

(56) References Cited

U.S. PATENT DOCUMENTS

| | | | |
|---|---|---|---|
| 2004/0268224 A1* | 12/2004 | Balkus | G06F 17/30056 715/203 |
| 2012/0254456 A1 | 10/2012 | Visharam et al. | |
| 2013/0163953 A1 | 6/2013 | Peacock | |
| 2014/0068693 A1 | 3/2014 | Hierro | |
| 2015/0120813 A2* | 4/2015 | Robbin | H04L 65/60 709/203 |

OTHER PUBLICATIONS

Akamai; http://mediapm.edgesuite.net/edgeflash/public/debug/HDPlayer.html; Obtained Feb. 11, 2015, 1 page.

Noel, O.; "Video, Web, Technologies . . . "; http://www.alkannoide.com/2012/12/10/mistserver-a-new-multimedia-streaming-server-first-overview/; Dec. 12, 2012, 5 pages.

* cited by examiner

MEDIA SERVER MANAGER

Add Application

APPLICATIONS live

VOD
Monitoring
Security – Playback
DRM

Setup | Properties | Modules

\* = Required Field

Save | Cancel

Application Description

Playback Types\*
☑ HDS
☐ RTMP
☑ HLS
☐ Smooth
☑ MPEG-DASH
☐ RTSP/RTP

Test Players

MEDIA SERVER MANAGER

Setup                                                                 ( Test Players )

\* = Required Field ( Save )  ( Cancel )

Add Application

APPLICATIONS
live
VOD
  Monitoring
  Security – Playback
  DRM

Token-Based Content Protection
☐ Enable Token-Based content protection

[                              ]

Enter or generate a string of characters to use as your shared secret.

( Generate Shared Secret )

Video Embedding
☐ Restrict embedding to the following domains:

[                              ]

Comma-separated list that includes your domain at minimum. Example: localhost, mysite.com

Client Restrictions
⦿ No client restrictions
○ Only allow playback from the following IP addresses
○ Do NOT allow playback from the following IP addresses

[                              ]

Comma-separated list of IP addresses

MEDIA SERVER MANAGER

Add Application | Test Players

APPLICATIONS live
- Monitoring
- Incoming Publishers
- Incoming Streams
- Incoming Security
- Outgoing Security
- Stream Files
- SMIL Files
- nDVR
- DRM
- VOD

Setup

* = Required Field

[Save] [Cancel]

RTMP Publishing
- ● Open (no authentication required)
- ○ Require password authentication
- ○ RTMP publishing not allowed

RTSP Publishing
- ● Open (no authentication required)
- ○ Require password authentication
- ○ RTSP publishing not allowed

Client Restrictions
- ● No client restrictions
- ○ Only allow publishing from the following IP addresses
- ○ Do NOT allow publishing from the following IP addresses

[                    ]

Comma-separated list of IP addresses

Duplicate Stream Names
- ☐ Reject a second stream with the same name that's published to this application

Version String

[                    ]

Comma-separated list of strings.

SERVER CONFIGURATION INCLUDING STREAM PREVIEW

CROSS-REFERENCE TO RELATED APPLICATIONS

The present application is a continuation of and claims priority to U.S. Non-Provisional patent application Ser. No. 14/619,936 filed on Feb. 11, 2015 and issued on May 10, 2016 as U.S. Pat. No. 9,338,203, which claims priority to U.S. Provisional Patent Application No. 61/938,633 filed on Feb. 11, 2014, the contents of which are incorporated by reference in their entirety.

BACKGROUND

The popularity of the Internet, coupled with the increasing capabilities of personal/mobile electronic devices, has provided consumers with the ability to enjoy multimedia content almost anytime and anywhere. For example, live (e.g., sports events) and video on demand (VOD) content (e.g., television shows and movies) can be streamed via the Internet to personal electronic devices (e.g., computers, mobile phones, and Internet-enabled televisions).

In a client-server system, a server may provide a multimedia stream to each client device that requests the stream. Due to the variety of client devices available to consumers, different client devices may request versions of a stream that differ with respect to resolution, streaming protocol, encoding format, etc. Due to the large number of possible stream configurations, configuring and testing the server may be a cumbersome and time-consuming process.

SUMMARY

The present disclosure is directed to a graphical user interface (GUI) that is generated by a media server to enable a user or an administrator to configure the media server. The GUI may receive input that causes the media server to receive or to simulate receipt of a media stream (e.g., a live or on demand stream of audio data, video data, or both). The GUI may also receive input to configure a transcoding and/or transmuxing module of the media server. The GUI may further be configured to dynamically instantiate test media players to play different streams output by the media server. Thus, the GUI may enable a user or an administrator to test the media server's ability to generate multiple output versions (e.g., adaptive bitrate (ABR) renditions) of an input stream, where the output versions differ with respect to one or more of streaming protocol, bitrate, resolution, audio encoding, video encoding, etc. The described GUI may thus provide a one-stop stream testing solution that can be used by a user or administrator prior to putting the media server in a production or client facing environment. Advantageously, the described GUI-based stream testing mechanism does not require a user or administrator of the server to test different types of streams by connecting to the media server using different types of devices (e.g., different mobile phones, tablet computers, laptop computers, set-top boxes, etc.).

DETAILED DESCRIPTION

Figure 1:
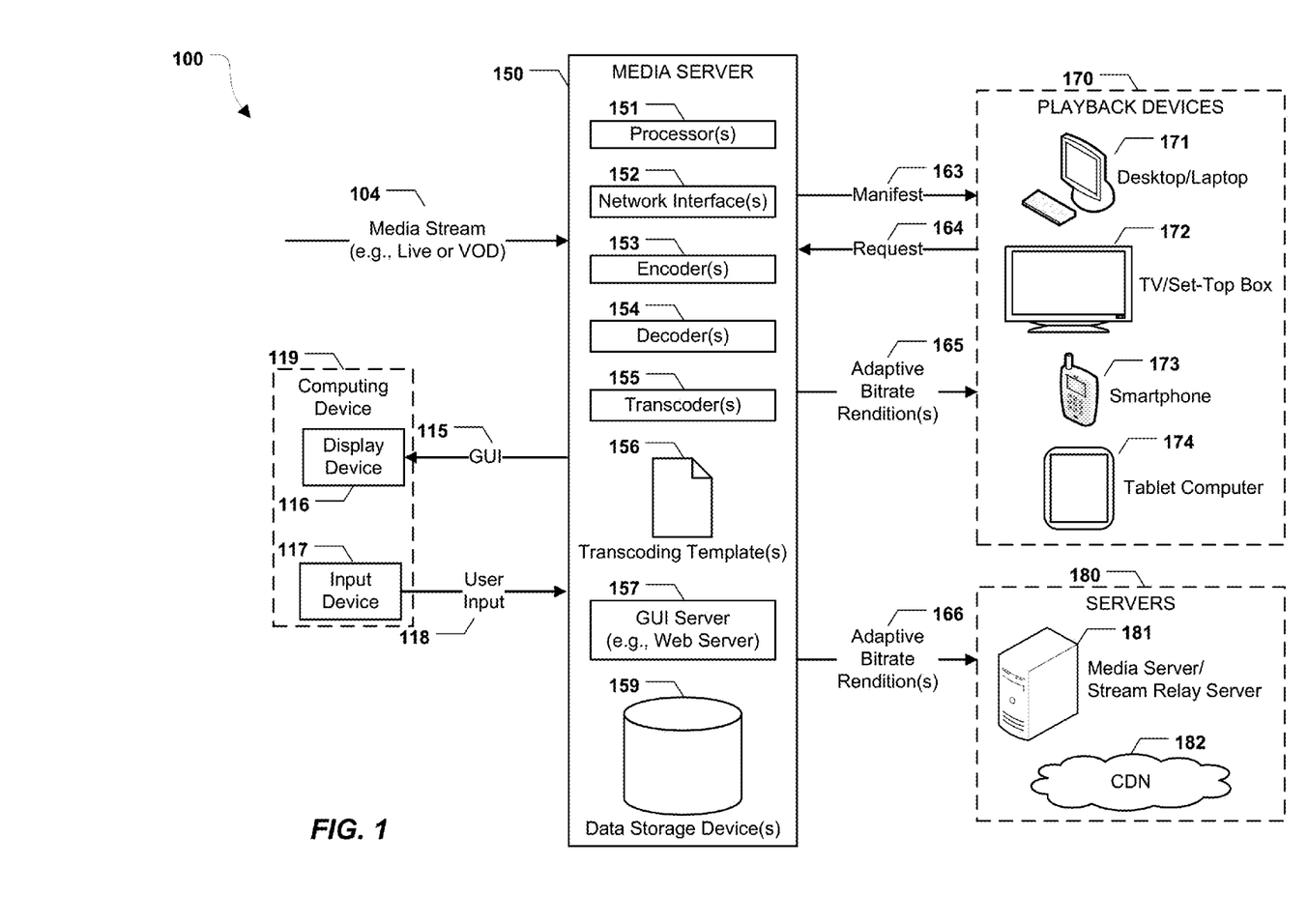
FIG. 1 is a diagram of a particular embodiment of a system that is operable to support configuration of a media server via a GUI that includes stream previews.

FIG. 1 illustrates a particular embodiment of a system 100 that is operable to support configuration of a media server 150 via a graphical user interface (GUI) 115 that includes stream previews.

The media server 150 may include one or more processors 151 and various components that are executable by the processor(s) 151. The media server 150 may correspond to or include software application(s) that perform media serving or processing, hardware systems (e.g., servers) that support or perform media serving and processing, or any combination thereof. Thus, various operations described with reference to the media server 150, or components thereof, may be implemented using hardware, software (e.g., instructions executable by the processor(s) 151), or any combination thereof.

The media server 150 may include one or more network interfaces 152. For example, the network interface(s) 152 may include input interface(s) and output interface(s) that are configured to receive data and to send data, respectively. In a particular embodiment, the network interface(s) 152 may be wired and/or wireless interfaces that enable the media server 150 to communicate data via a network, such as the Internet. For example, the network interface(s) 152 may include an Ethernet interface, a wireless interface compatible with an IEEE 802.11 protocol, or other wired or wireless interfaces.

The media server 150 may include various components configured to perform stream processing functions. For example, the media server 150 may include one or more video processing components, such as the encoders 153, the decoders 154, and transcoders 155, each of which may be implemented using hardware, software (e.g., instructions executable by the processor(s) 151), or both. The decoder(s) 154 may decode data received by the media server 150. For example, the decoder(s) 154 may decode a received media stream 104 (e.g., a live or video on demand (VOD) audio-only, video-only, or audio-video stream). The encoder(s) 153 may encode data that is to be transmitted by the media server 150. The transcoder(s) 155 may be configured to perform bitrate conversion, CODEC conversion, frame size conversion, etc. In a particular embodiment, a transcoding operation performed by the transcoder(s) 155 may trigger a decoding operation by the decoder(s) 154 and/or a re-encoding operation by the encoder(s) 153. In a particular embodiment, parameters used by the transcoder(s) 155 are stored in one or more transcoding templates 156 at the media server 150. Alternately, or in addition, encoding/decoding/transcoding parameters, as well as other configuration options for the media server 150, may be received via a server configuration GUI, as further described herein.

The encoder(s) 153, decoder(s) 154, and transcoder(s) 155 may thus enable the media server 150 to process data in accordance with multiple coding technologies and protocols. To illustrate, the media server 150 may convert a media stream (e.g., audio and/or video data) from one format or transmission protocol to multiple other formats or transmission protocols. For example, video streams received and transmitted by the media server 150 may be associated with the same encoding format and transmission protocol or may be associated with different encoding formats and transmission protocols. In a particular embodiment, the media server 150 may generate video streams by performing video decoding, encoding, transcoding, and/or transmuxing operations (e.g., to modify a video encoding format, an audio encoding format, a bitrate, an aspect ratio, packaging, etc.). In a transmuxing operation, encoded audio and video may be repackaged without modifying the encoded audio and video.

For example, the media server 150 may support video encoding types including, but not limited to, H.264, On2 VP6, Sorenson Spark, Screen video, Screen video 2, motion picture experts group (MPEG) 2 (MPEG-2), and MPEG-4 Part 2. The media server 150 may support audio encoding types including, but not limited to, advanced audio coding (AAC), AAC low complexity (AAC LC), AAC high efficiency (HE-AAC), G.711, MPEG Audio Layer 3 (MP3), Speex, Nellymoser Asao, and AC-3.

Further, the media server 150 may support communication (e.g., adaptive streaming and non-adaptive streaming) protocols including, but not limited to, hypertext transfer protocol (HTTP) live streaming (HLS), HTTP dynamic streaming (HDS), smooth streaming, and MPEG dynamic adaptive streaming over HTTP (MPEG-DASH) (also known as international organization for standardization (ISO)/international electrotechnical commission (IEC) 23009-1). The media server 150 may also support real time messaging protocol (RTMP) (and variants thereof), real-time streaming protocol (RTSP), real-time transport protocol (RTP), and MPEG-2 transport stream (MPEG-TS). Additional audio formats, video formats, coder/decoders (CODECs), and/or protocols may also be supported.

In a particular embodiment, the media server 150 includes one or more data storage devices 159 (e.g., random access memory (RAM), disk-based storage, solid-state non-volatile memory, etc.). The data storage device(s) 159 may store stream data (e.g., frames of a live or VOD stream), files, closed caption data, images (e.g., to be overlaid on top of a video stream), etc.

The media server 150 may be configured to send and receive data from various other devices. For example, the media server 150 may communicate with one or more playback devices 170 (e.g., devices that are configured to stream video content) and one or more other servers 180. Examples of playback devices include a smartphone, a tablet computer, a laptop computer, a desktop computer, a set-top box, a television, a portable media player, a game console, etc. In the embodiment of FIG. 1, the playback devices 170 include a desktop/laptop computing device 171, a television (TV)/set-top box 172, a smartphone 173, and a tablet computer 174. Examples of servers include a media server, a stream relay server, a server of a content distribution network (CDN), such as an edge server, etc. In the embodiment of FIG. 1, the other servers 180 include a media server/stream relay server 181 and a server of a CDN 182.

In a particular embodiment, the media server 150 supports adaptive bitrate (ABR) streaming. For example, the media server 150 may perform one or more stream processing operations on the media stream 104 to generate a plurality of ABR renditions 165, 166. In a particular embodiment, the media server 150 generates an adaptive streaming manifest 163 that includes information describing each of the ABR renditions 165, 166 that are available for adaptive streaming. To initiate an adaptive streaming session, a destination device, e.g., the computing device 171, may request the manifest 163. Upon receiving the manifest 163, the computing device 171 may determine which of the available renditions should be requested from the media server 150. For example, the computing device 171 may make such a determination based on buffering/processing capability at the computing device 171 and/or network conditions (e.g., bandwidth) being experienced by the computing device 171.

Upon determining which rendition should be requested, the computing device 171 may transmit a request 164 to the media server 150. The request 164 may specify a particular portion (e.g., portion "X") of the requested rendition. The particular portion may be specified using start/end frame numbers, start/end times, a portion number/identifier, etc. Depending on the adaptive streaming protocol in use, the requested portion may correspond to a "chunk" of a rendition and/or a group of pictures (GOP). A "chunk" may refer to a fixed (e.g., ten seconds) or variable length duration of a stream rendition. A group of pictures may refer to a collection of video frames that includes one or more intra-coded frames (I-frames) and one or more additional frames that include difference information relative to the one or more I-frames (e.g., P-frame and/or B-frames). If there are no problems with receipt and playback of the requested portion, the computing device 171 may request a subsequent portion (e.g., portion "X+1") of the same rendition. However, if playback and/or network conditions become worse, the computing device 171 may switch to a lower bitrate rendition by requesting subsequent portions of the lower bitrate rendition. Conversely, if playback and/or network conditions improve, the computing device 171 may switch to a higher bitrate rendition. The media server 150 may generate key frame aligned portions for the adaptive streaming renditions, so that switching to a lower bitrate or higher bitrate rendition appears "seamless" (e.g., does not result in noticeable visual glitches or dropped frames).

To aid in configuration of the media server 150, the media server 150 may include a GUI server 157. The GUI server 157 may be configured to generate a server configuration GUI 115. In a particular embodiment, the GUI server 157 is a web server and the GUI 115 is accessible at a particular uniform resource locator (URL) via a web browser (e.g., http://www.mymediaserver.com:8088). The GUI 115 may be embodied as one or web pages in accordance with hypertext markup language 5 (HTML5) and cascading style sheets 3 (CSS3). As a user or administrator interacts with the GUI 115, additional web pages may be presented. Each additional web page can be considered part of the GUI 115 or a separate GUI. The GUI 115 may be displayed by a display device 116, and may present (e.g., to a user or an administrator) various configuration options for the media server 150. In a particular embodiment, the display device 116 is coupled to the media server 150. Alternately, the display device 116 may be part of or coupled to a computing device 119 that is remote from the media server 150. To illustrate, the display device 116 may be part of or coupled to a desktop computer, a laptop computer, a server computer, a mobile device (e.g., a mobile phone, a smartphone, a tablet computer, etc.), or any combination thereof, that is configured to communicate with the media server 150 via a network (e.g., the Internet).

A user or administrator may interact with the GUI 115 via an input device 117 (e.g., a keyboard, a mouse, a touchscreen, etc.) to provide user input 118. The input device 117 may be coupled to the media server 150, or may be part of or coupled to a computing device 119 that is remote to the media server 150. The user input 118 may be responsive to the GUI 115 (e.g., may include selections or input values corresponding to server configuration options presented by the GUI 115).

During operation, a user/administrator may use the GUI 115 to set up VOD streaming and/or live streaming. For example, in VOD streaming, the media stream 104 may correspond to pre-recorded content received from a remote device. Alternately, the pre-recorded content may be retrieved from the data storage device(s) 159 at the media server 150. As another example, in live streaming, the media stream 104 may correspond to content being captured via a camera and/or microphone. The live or VOD stream may be received from the computing device 119 (e.g., the device to which the GUI 115 is sent and from which the user input 118 is received). For example, in a single-computing-device device test environment, the single computing device may capture a live media stream or generate a VOD media stream from a stored file, include the display device 116, include the input device 117, and include the media server 150 that generates multiple output streams corresponding to different output formats.

In a particular embodiment, setting up VOD or live streaming may include providing the user input 118 indicating stream playback type(s), such as one or more of HDS, RTMP, HLS, smooth streaming, MPEG-DASH, RTSP, RTP, or mobile. Setting up VOD or live streaming may also include setting up stream playback and/or publishing security, such as whether to restrict stream viewers to particular IP addresses, whether to restrict stream embedding to particular domains, whether to require a password for publishing, etc.

After setting up live or VOD streaming, a user or administrator may use the GUI 115 to test output streams (e.g., the ABR renditions 165, 166) corresponding to the selected playback types. For example, the user or administrator may select a "Test Players" button on the GUI 115 to dynamically instantiate one or more test players (e.g., media players) to connect to (or to simulate connecting to) the media server 150 and play back particular output streams. Each test player may include various functions and features, such as the ability to rewind the corresponding output stream (e.g., by 30 seconds), play the corresponding output stream, pause the corresponding output stream, adjust an audio volume, start/stop/disconnect/reconnect to the corresponding output stream, etc. Each test player may also indicate a bitrate of the corresponding output stream, a URL from which the stream is being received, a server, an application, a stream name, a stream status, and/or whether digital rights management (DRM) is enabled. In a particular embodiment, each test player corresponds to a software class, package, or application that is dynamically loaded and/or executed by a computing device (e.g., the computing device 119) in response to user input 118 requesting testing of the corresponding output stream. For example, different test players may simulate and/or emulate playback operations of different playback devices 170. When a second output format is selected, the computing device 119 may stop execution of, and deallocate from memory, a test player corresponding to a previously selected first output format. Further, the media server 150 may stop sending a first output stream corresponding to the first output format to the computing device 119 and start sending a second output stream corresponding to the second output format to the computing device 119. Thus, test players may be loaded by the GUI in just-time-time fashion to reduce a memory and processing footprint of the GUI 115 at the computing device 119. Alternately, selecting multiple output formats may cause multiple test players to be loaded and concurrently executed (e.g., to test concurrent output streaming capabilities of the media server 150). In this embodiment, the media server 150 may continue sending the first output stream to the computing device 119 while sending the second output stream to the computing device 119. Output streams may differ from each other with respect to one or more of streaming protocol, bitrate, resolution, audio encoding, video encoding, etc. Illustrative examples of the GUI 115 are presented in FIGS. 2-8.

The system 100 of FIG. 1 may thus enable a user or administrator to dynamically test various output streams generated by the media server 150 from a single configuration GUI 115. To illustrate, using the GUI 115, output streams corresponding to multiple combinations of output streaming protocol, video/audio CODEC, bitrate, frame rate, key frame interval, frame resolution, number of audio channels, etc. may be tested. The GUI 115 may thus shorten testing time as compared to having to configure multiple devices (e.g., mobile phones, tablet computers, set-top boxes, etc.), where each device plays back a single device-specific output stream for testing purposes.

It should be noted that the server configuration GUI 115 may present options related to items other than output stream testing. For example, the GUI 115 (which may alternately be referred to as a "web console") may be used to manage user/administrator accounts for the media server 150, including secure sign-in options and read-only accounts. The GUI 115 may also be used to configure live and VOD streaming applications. The GUI 115 may further be used to enable or disable certain modules and functions of the media server 150, such as the transcoder(s) 155, a DRM module, and a network digital video recorder (nDVR) module to record live media streams for subsequent playback. The GUI 115 may also include options related to configuring live stream repeaters in accordance with an origin/edge network topology to increase live stream scalability. The GUI 115 may further include options related to configuring a media cache to increase VOD stream scalability.

In a particular embodiment, the GUI 115 includes options to configure streams to start automatically when the media server 150 starts operation, to manage virtual hosts and internet protocol (IP) addresses/port allocations, to configure username/password authentication for stream publication, to manage security options for client publishing and playback, or any combination thereof. The GUI 115 may also include options to tune performance settings at the media server 150, such as a size of a heap available for dynamic memory allocation, garbage collection (GC) options, thread pool sizes, and thread allocation settings. The GUI 115 may further be configured to display statistics and visualizations, on a collective and/or incoming/outgoing connection basis, to monitor performance of the media server 150 (e.g., processor usage, memory usage, heap usage, disk usage, network throughput, server uptime, etc.). The GUI 115 may also be used to manage software license keys and to provide one-button restarts of the media server 150 or of individual streams/streaming applications.

Figure 2:
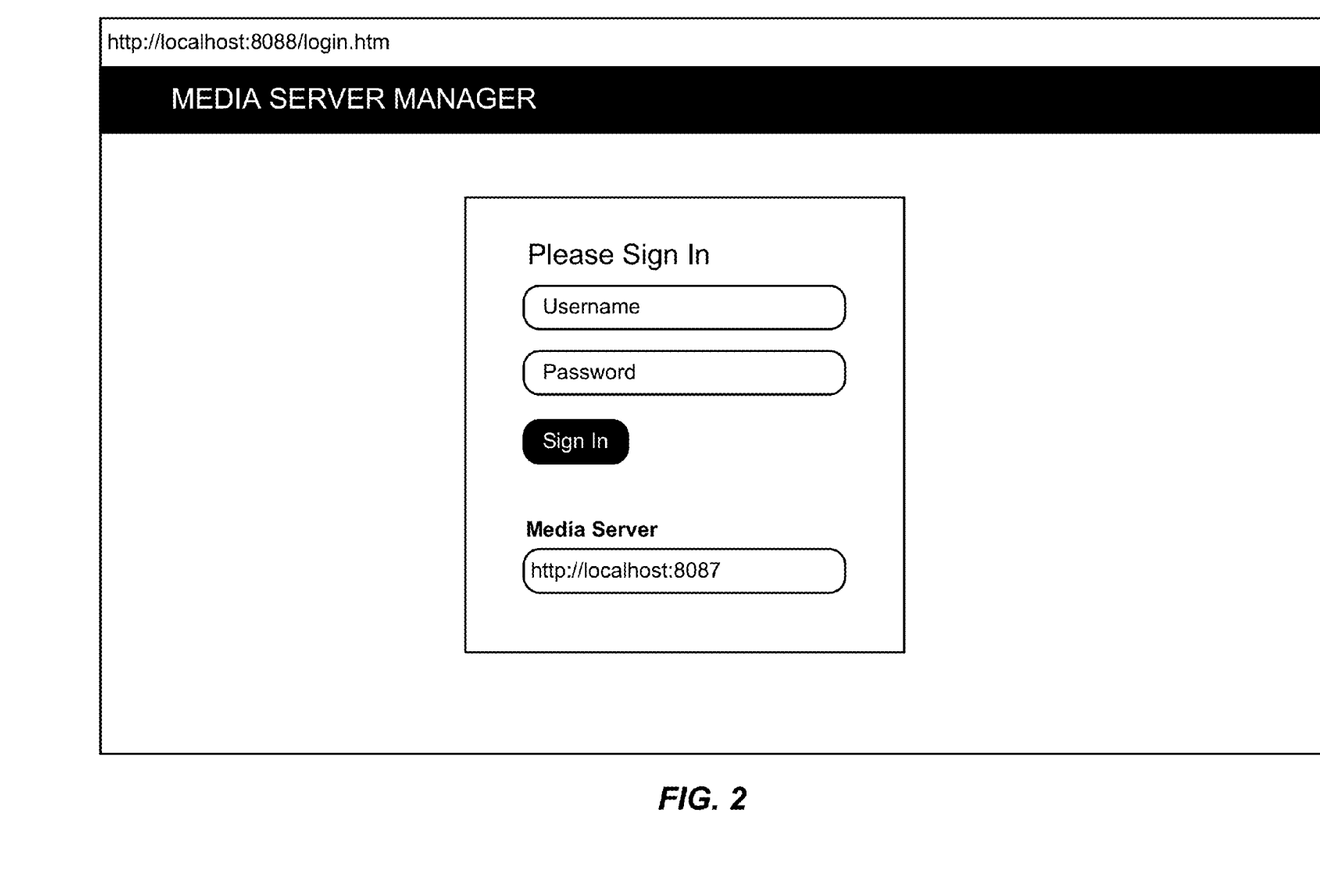
FIG. 2 illustrates a first particular embodiment of the GUI of FIG. 1.

FIGS. 2-8 illustrate exemplary embodiments of the GUI 115 of FIG. 1. Referring to FIG. 2, a GUI provides the ability to log in to a media server (e.g., the media server 150) for configuration and testing purposes. In the illustrated example, the media server is located at localhost:8087 and the GUI is accessible at localhost:8088 (i.e., the GUI is being displayed at a display device that is part of or coupled to the media server).

Figure 3:
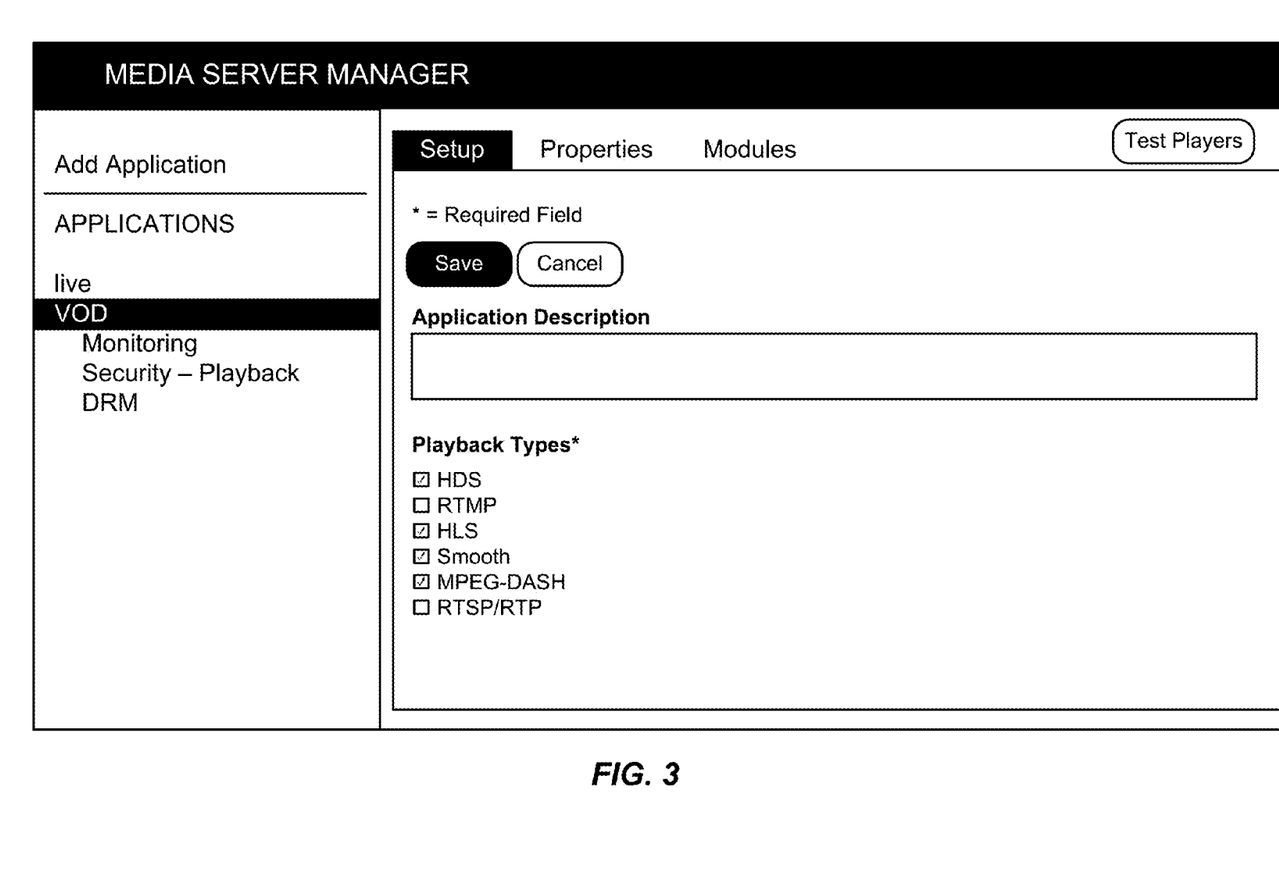
FIG. 3 illustrates a second particular embodiment of the GUI of FIG. 1.
Figure 4:
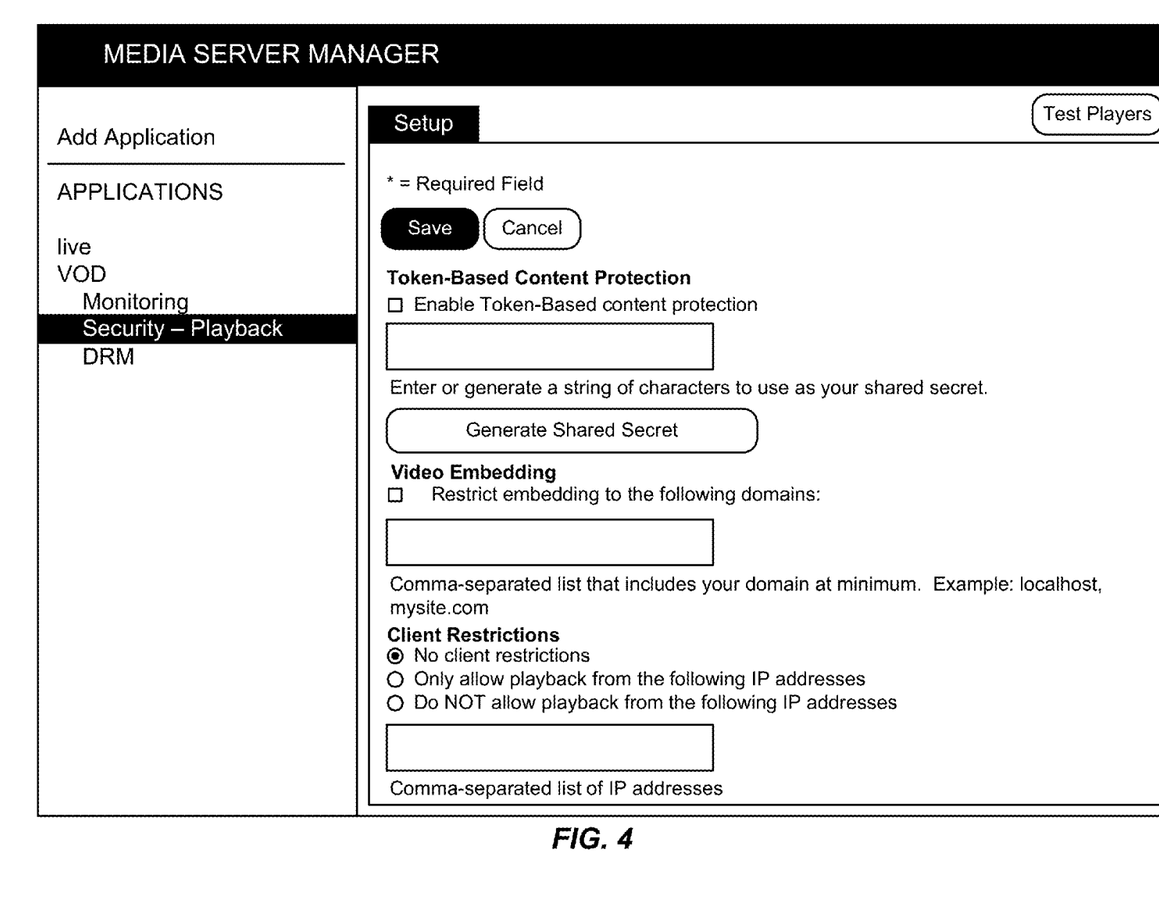
FIG. 4 illustrates a third particular embodiment of the GUI of FIG. 1.
Figure 5:
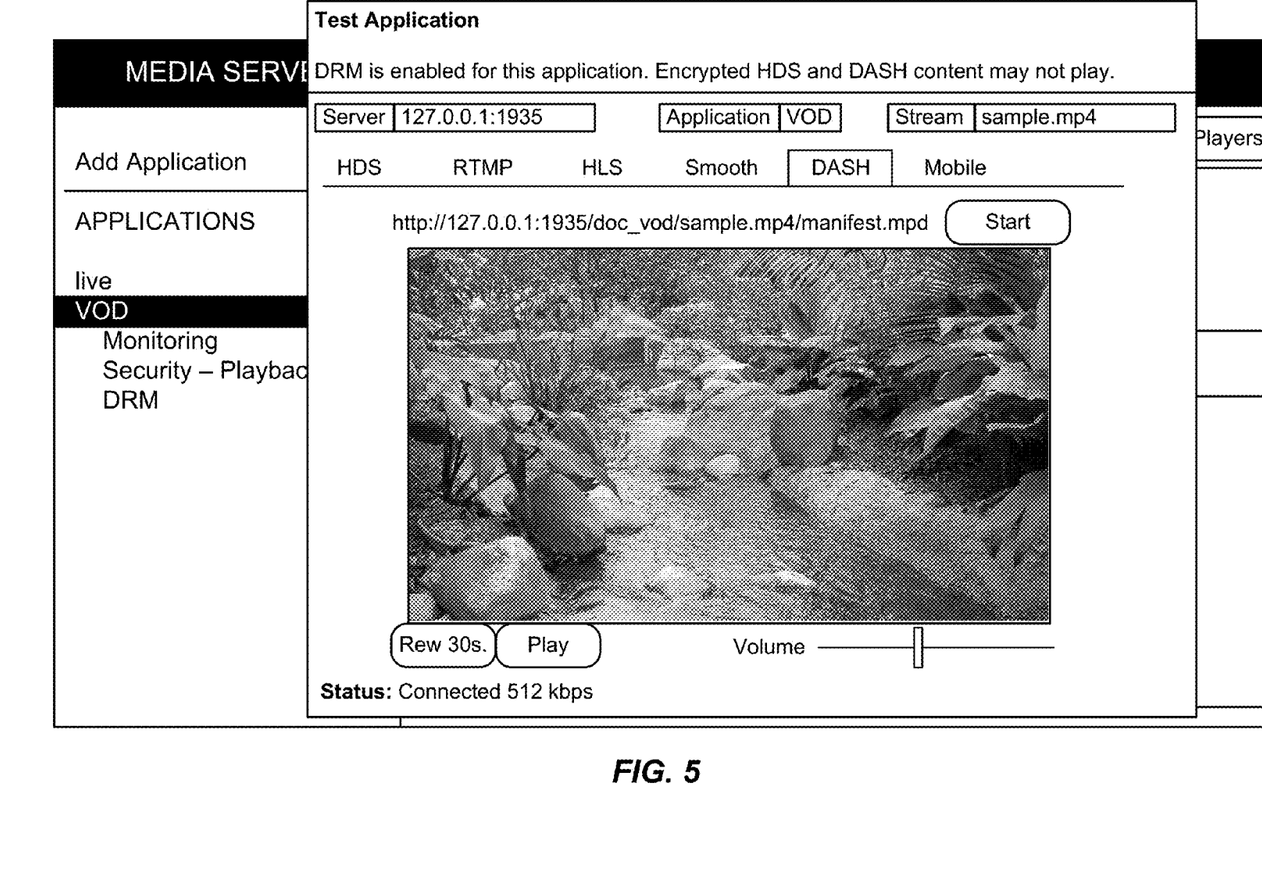
FIG. 5 illustrates a fourth particular embodiment of the GUI of FIG. 1.

Referring to FIG. 3, a GUI illustrates setting up a VOD streaming application (entitled "VOD"). In the illustrated example, HDS, HLS, Smooth, and MPEG-DASH output stream formats are selected. A textual "application description" for the VOD application may also be entered into the GUI, as shown. Continuing to FIG. 4, a GUI illustrates playback security options for VOD streaming, including token-based security and shared secret entry or generation, restriction of video embedding to particular domains, and client IP address restrictions for stream playback. A "Test Players" button at the top right of the GUI may be selected to launch a test application that dynamically loads test media players in response to user input. FIG. 5 illustrates a window corresponding to such a test application. In the illustrated embodiment, a tab corresponding to the "DASH" stream output format is selected. In response to selection of the tab, a test player is loaded and executed to view a VOD stream corresponding to a "sample.mp4" file stored at the media server. In a particular embodiment, the "sample.mp4" file may be designated during configuration of the VOD streaming application e.g., using the "Setup," "Properties," or "Modules" tab in the GUI of FIG. 3. As described with reference to FIG. 1, selection of a different tab (e.g., the HDS, RTMP, HLS, Smooth, or Mobile tab) may stop execution of the "DASH" test application and initiate execution of another test application. Alternately, the "DASH" test application may continue to execute concurrently with the other application and multiple output streams may be received (and optionally displayed) concurrently by the computing device displaying the GUI.

Figure 6:
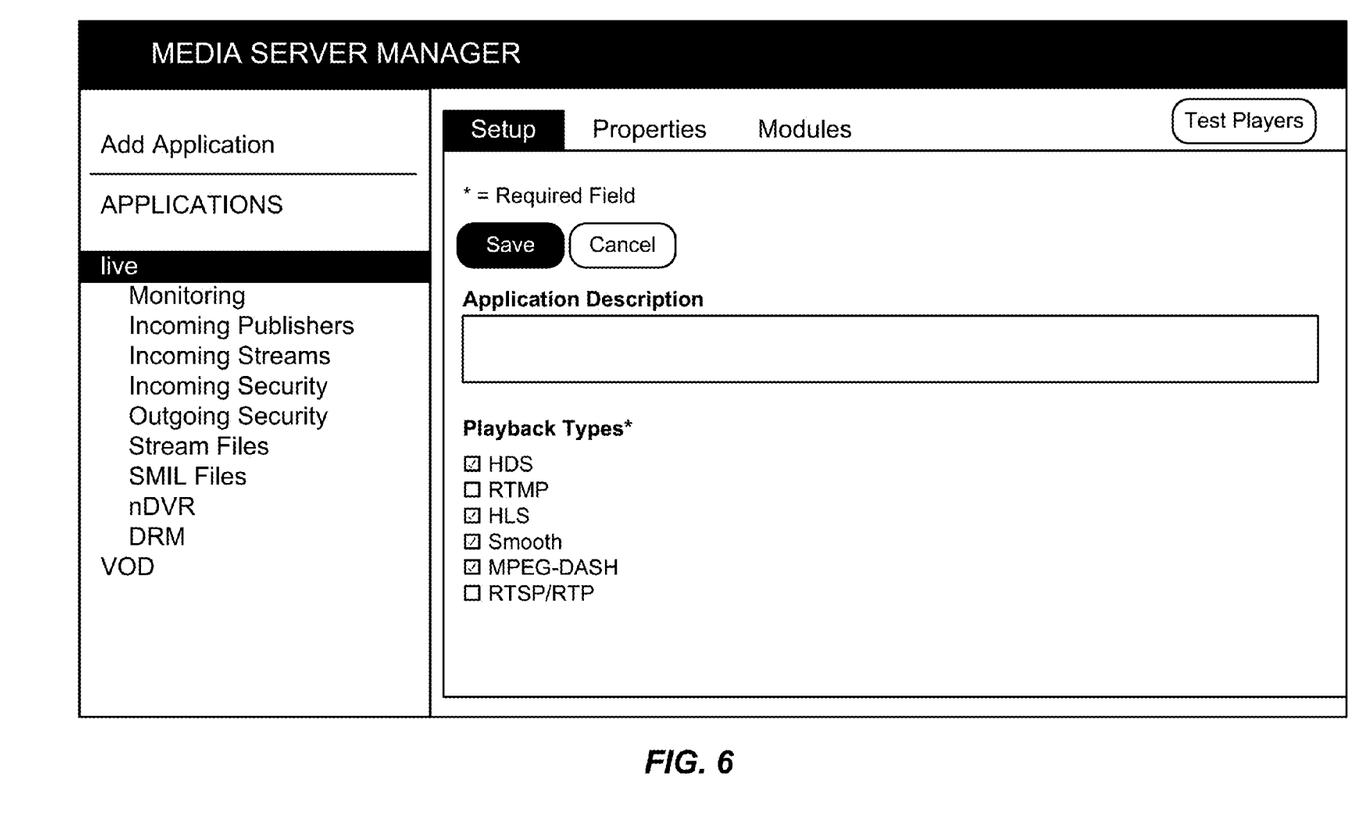
FIG. 6 illustrates a fifth particular embodiment of the GUI of FIG. 1.
Figure 7:
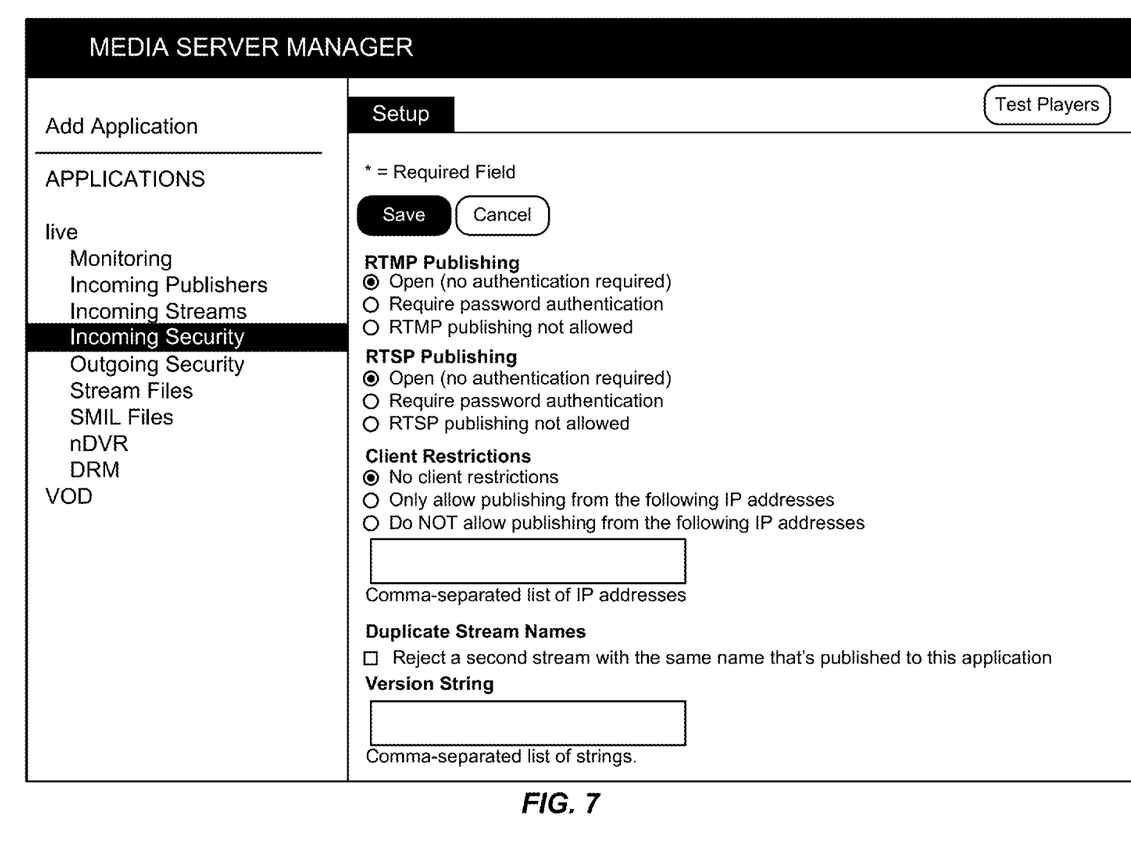
FIG. 7 illustrates a sixth particular embodiment of the GUI of FIG. 1.
Figure 8:
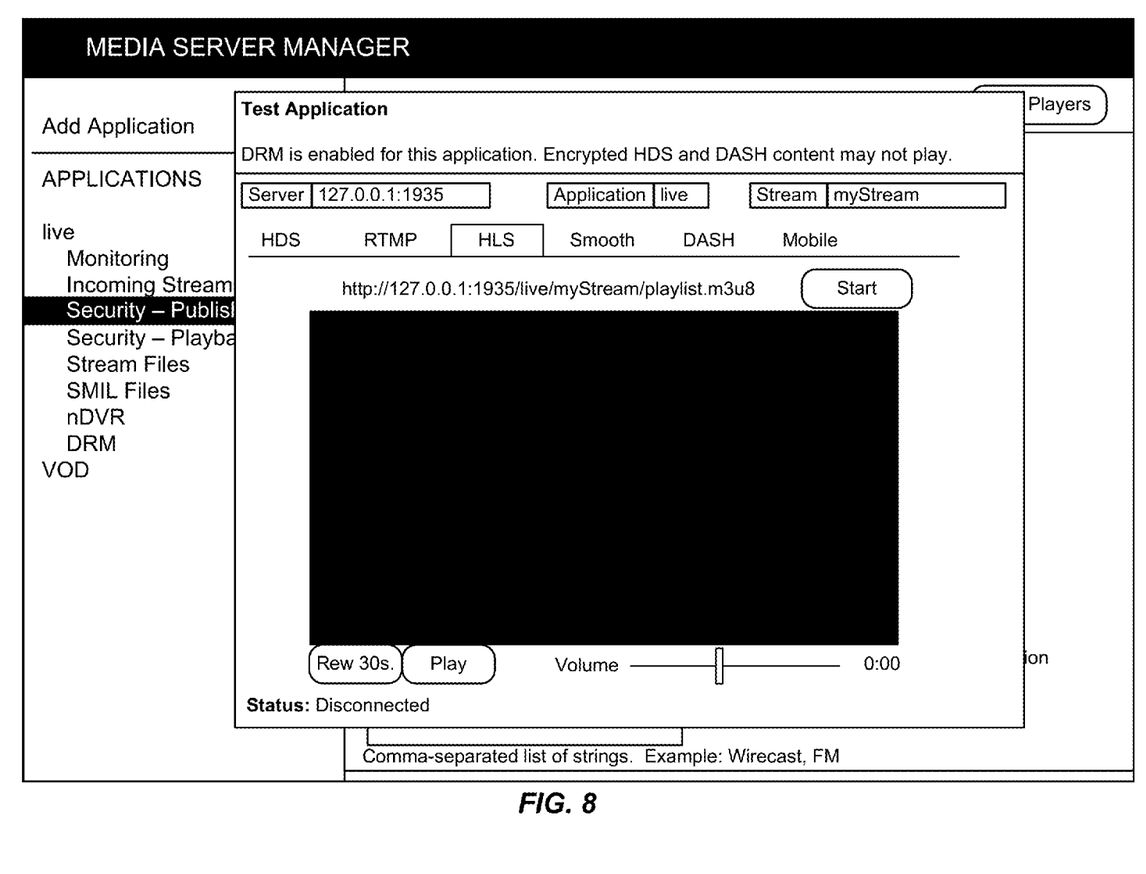
FIG. 8 illustrates a sixth particular embodiment of the GUI of FIG. 1.

Referring to FIG. 6, a GUI illustrates setting up a live streaming application (entitled "live"). In the illustrated example, HDS, HLS, Smooth, and MPEG-DASH output stream formats are selected. A textual "application description" for the live application may also be entered into the GUI, as shown. Continuing to FIG. 7, a GUI illustrates incoming security options for live streaming, including RTMP/RTSP authentication, client IP address restriction for stream playback, rejection of duplicate stream names, and version strings. A "Test Players" button at the top right of the GUI may be selected to launch a test application that dynamically loads test media players in response to user input. FIG. 8 illustrates a window corresponding to such a test application. In the illustrated embodiment, a tab corresponding to the "HLS" stream output format is selected. In response to selection of the tab, a "HLS" test player is loaded and executed to view a live stream corresponding to the adaptive bitrate (ABR) manifest "manifest.m3u8." For example, the ABR manifest may be the ABR manifest 163 of FIG. 3. As described with reference to FIG. 1, selection of a different tab may stop execution of the "HLS" test application and initiate execution of another test application. Alternately, the "HLS" test application may continue to execute concurrently with the other application and multiple output streams may be received (and optionally displayed) concurrently by the computing device displaying the GUI.

Figure 9:
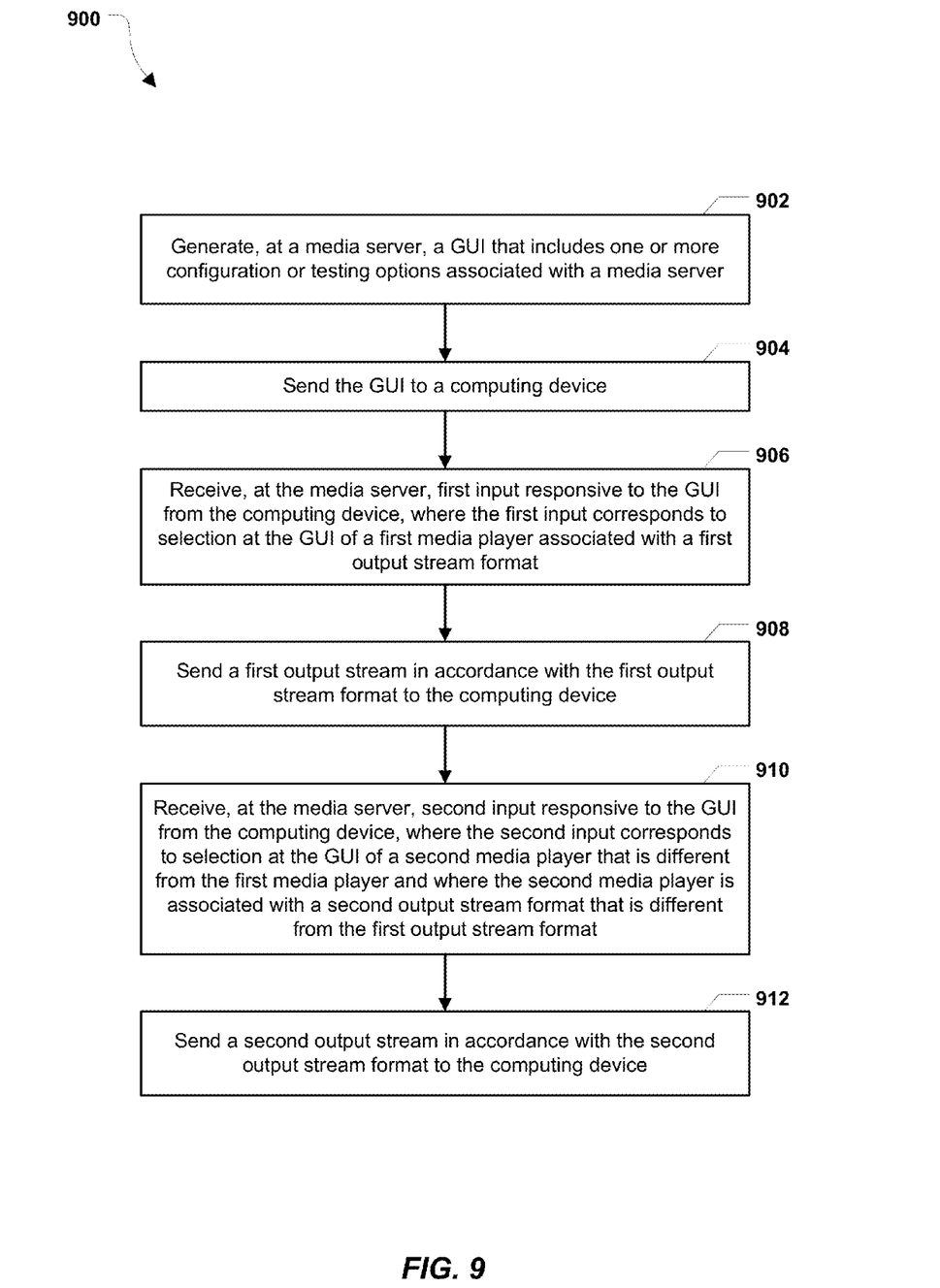
FIG. 9 is a flowchart of a particular embodiment of a method of operation at the media server of FIG. 1.

FIG. 9 illustrates a particular embodiment of a method 900 of operation at a media server. In an illustrative embodiment, the method 900 may be performed by the media server 150 of FIG. 1.

The method 900 includes generating, at a media server, a GUI that includes one or more configuration or testing options associated with a media server, at 902, and sending the GUI to a computing device, at 904. For example, referring to FIG. 1, the media server 150 may generate and send the GUI 115 to the display device 116.

The method 900 also includes, receiving, at the media server, first input responsive to the GUI from the computing device, at 906. The first input corresponds to selection at the GUI of a first media player associated with a first output stream format. The method 900 further includes, in response to the first input, sending a first output stream in accordance with the first output stream format to the computing device, at 908. For example, the "DASH" tab of FIG. 4 or FIG. 9 may be selected. The first format may be smooth streaming and the "DASH" test player may be initialized and executed to view the first output stream.

The method 900 includes receiving, at the media server, second input responsive to the GUI from the computing device, at 910. The second input corresponds to selection at the GUI of a second media player that is different from the first media player, where the second media player is associated with a second output stream format that is different from the first output stream format. The method 900 also includes, in response to the second input, sending a second output stream in accordance with the second output stream format to the computing device, at 912. For example, the "HLS" tab of FIG. 4 or FIG. 9 may be selected. The second format may be HLS and the "HLS" test player may be initialized and executed to view the second output stream.

It should be noted that the order of steps or operations described with reference to FIGS. 1-9 is to be considered illustrative, not limiting. In alternate embodiments, the order of steps may be different. Further, one or more steps may be optional and/or replaced by other steps. In addition, one or more steps may be consolidated. In accordance with various embodiments of the present disclosure, one or more methods, functions, and modules described herein may be implemented by software programs executable by a computer system. Further, implementations can include distributed processing, component/object distributed processing, and/or parallel processing.

Particular embodiments can be implemented using a computer system executing a set of instructions that cause the computer system to perform any one or more of the methods or computer-based functions disclosed herein. A computer system may include a laptop computer, a desktop computer, a server computer, a mobile phone, a tablet computer, a set-top box, a media player, one or more other computing devices, or any combination thereof. The computer system may be connected, e.g., using a network, to other computer systems or peripheral devices. For example, the computer system or components thereof can include or be included within any one or more of the media server 150 of FIG. 1, the display device 116 of FIG. 1, the input device 117 of FIG. 1, the computing device 119 of FIG. 1, the desktop/laptop computing device 171 of FIG. 1, the TV/set-top box 172 of FIG. 1, the smartphone 173 of FIG. 1, the tablet computer 174 of FIG. 1, the media server/stream relay server 181 of FIG. 1, a server (e.g., edge server) of the CDN 182 FIG. 1, or any combination thereof.

In a networked deployment, the computer system may operate in the capacity of a server or as a client user computer in a server-client user network environment, or as a peer computer system in a peer-to-peer (or distributed) network environment. The term "system" can include any collection of systems or sub-systems that individually or jointly execute a set, or multiple sets, of instructions to perform one or more computer functions.

In a particular embodiment, the instructions can be embodied in a computer-readable or a processor-readable device. The terms "computer-readable device" and "processor-readable device" include a single storage device or multiple storage devices, such as a centralized or distributed database, and/or associated caches and servers that store one or more sets of instructions. The terms "computer-readable device" and "processor-readable device" also include any device that is capable of storing a set of instructions for execution by a processor or that cause a computer system to perform any one or more of the methods or operations disclosed herein. For example, a computer-readable or processor-readable device or storage device may include random access memory (RAM), flash memory, read-only memory (ROM), programmable read-only memory (PROM), erasable programmable read-only memory (EPROM), electrically erasable programmable read-only memory (EEPROM), registers, a hard disk, a removable disk, a disc-based memory (e.g., compact disc read-only memory (CD-ROM)), a solid-state memory, or any other form of storage device. A computer-readable or processor-readable device is not a signal.

As used herein, a "live" stream may differ from a "video on demand" (VOD) stream. A VOD stream originates from, or corresponds to, content that is available in its entirety at a stream source when a packet of the VOD stream is sent. For example, a VOD stream may correspond to a movie or television show that is stored at a storage device. A live stream corresponds to content that is not available in its entirety when a packet of the live stream is sent. For example, a live stream may be used to transmit audio and/or video content corresponding to an event as the event is being captured (e.g., in real-time or near-real time). Examples of such events may include, but are not limited to, in-progress sporting events, musical performances, video-conferences, and webcam feeds. It should be noted that a live stream may be delayed with respect to the event being captured (e.g., in accordance with government or industry regulations, such as delay regulations enforced by the Federal Communications Commission (FCC)). It should also be noted that although certain embodiments may be described herein with reference to video on demand, not all of the described techniques may require video content or data. Certain embodiments may also be used on demand content that does not include video (e.g., audio on demand radio or music streams).

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Accordingly, the disclosure and the figures are to be regarded as illustrative rather than restrictive.

Although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments.

The above-disclosed subject matter is to be considered illustrative, and not restrictive, and the appended claims are intended to cover all such modifications, enhancements, and other embodiments, which fall within the scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method comprising:
   receiving, at a media server, first input from a computing device, wherein the first input corresponds to selection of a first media player associated with a first output stream format;
   in response to the first input, sending a first stream preview in accordance with the first output stream format to the computing device;
   receiving, at the media server, second input from the computing device, wherein the second input corresponds to selection of a second media player that is different from the first media player, wherein the second media player is associated with a second output stream format that is different from the first output stream format; and
   in response to the second input, sending a second stream preview in accordance with the second output stream format to the computing device, wherein the first output stream format and the second output stream format differ from each other with respect to at least one of streaming protocol, bitrate, frame resolution, frame rate, key frame interval, audio encoding, video encoding, or number of audio channels.

2. The method of claim 1, further comprising generating, at the media server, a graphical user interface (GUI) indicating one or more configuration or testing options associated with the media server.

3. The method of claim 1, further comprising sending a graphical user interface (GUI) to the computing device, wherein the first input and the second input are received responsive to the GUI.

4. The method of claim 1, wherein the computing device is remote from the media server.

5. The method of claim 1, wherein at least one of the first input or the second input is received via an input device coupled to the computing device, and wherein the first input corresponds to a live stream.

6. The method of claim 1, wherein the second input is received after the first input, and further comprising stopping communication of at least a portion of the first stream preview to the computing device in response to the second input.

7. The method of claim 1, further comprising continuing to send the first stream preview to the computing device while sending the second stream preview to the computing device.

8. The method of claim 1, wherein the first media player corresponds to a first software class or software application, and wherein the second media player corresponds to a second software class or software application.

9. The method of claim 1, wherein the computing device is configured to execute software corresponding to the media server.

10. An apparatus comprising:
   a processor; and
   a memory storing instructions that, when executed by the processor, cause the processor to perform operations comprising:
      receiving first input from a computing device, wherein the first input corresponds to selection of a first media player associated with a first output stream format;
      in response to the first input, sending a first stream preview in accordance with the first output stream format to the computing device;
      receiving second input from the computing device, wherein the second input corresponds to selection of a second media player that is different from the first media player, wherein the second media player is associated with a second output stream format that is different from the first output stream format; and
      in response to the second input, sending a second stream preview in accordance with the second output stream format to the computing device, wherein the first output stream format and the second output stream format differ from each other with respect to at least one of streaming protocol, bitrate, frame resolution, frame rate, key frame interval, audio encoding, video encoding, or number of audio channels.

11. The apparatus of claim 10, wherein the operations further comprises generating a graphical user interface (GUI) indicating one or more configuration or testing options associated with a media server.

12. The apparatus of claim 10, wherein the operations further comprise sending a graphical user interface (GUI) to the computing device, wherein the first input and the second input are received responsive to the GUI.

13. The apparatus of claim 10, wherein the second input is received after the first input, and wherein the operations further comprise stopping communication of at least a portion of the first stream preview to the computing device in response to the second input.

14. The apparatus of claim 10, wherein the second input is received after the first input, and wherein the operations further comprise continuing to send the first stream preview to the computing device while sending the second stream preview to the computing device.

15. The apparatus of claim 10, wherein the first media player corresponds to a first software class or software application, and wherein the second media player corresponds to a second software class or software application.

16. A computer-readable storage device storing instructions that, when executed by a processor, cause the processor to perform operations comprising:
   sending first input to a media server, wherein the first input corresponds to selection of a first media player associated with a first output stream format;
   in response to sending the first input, receiving a first stream preview in accordance with the first output stream format from the media server;
   sending second input to the media server, wherein the second input corresponds to selection of a second media player that is different from the first media player, wherein the second media player is associated with a second output stream format that is different from the first output stream format; and
   in response to sending the second input, receiving a second stream preview in accordance with the second output stream format from the media server, wherein the first output stream format and the second output stream format differ from each other with respect to at least one of streaming protocol, bitrate, frame resolution, frame rate, key frame interval, audio encoding, video encoding, or number of audio channels.

17. The computer-readable storage device of claim 16, wherein the operations further comprises receiving, from the media server, a graphical user interface (GUI) indicating one or more configuration or testing options associated with the media server.

18. The method of claim 1, wherein the first output stream format associated with a first streaming protocol that is different than a second streaming protocol associated with the second output stream format.

19. The method of claim 1, wherein the first stream preview comprises an adaptive bitrate stream preview.

20. The method of claim 1, wherein the second input is received concurrently with receiving the first input.

* * * * *